Oct. 26, 1943.   C. W. MICHAEL   2,332,806
FARM IMPLEMENT FORETRUCK
Filed May 1, 1942   2 Sheets-Sheet 1
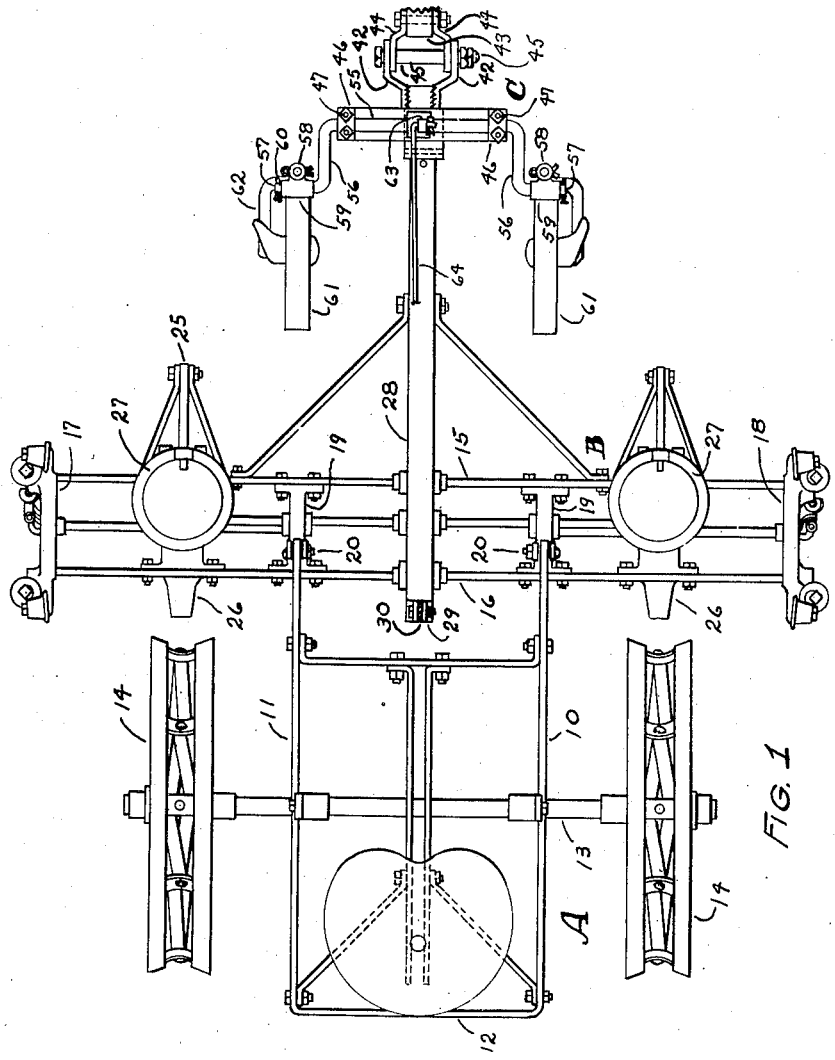
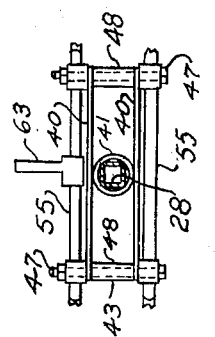
INVENTOR.
CLEMENT W. MICHAEL
BY
A.S.Krob
ATTORNEY Oct. 26, 1943.   C. W. MICHAEL   2,332,806
FARM IMPLEMENT FORETRUCK
Filed May 1, 1942   2 Sheets-Sheet 2
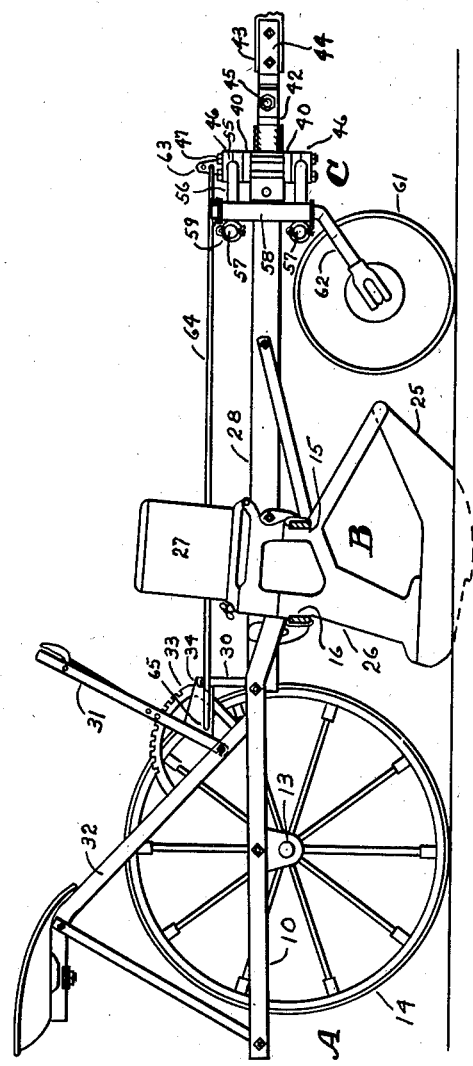
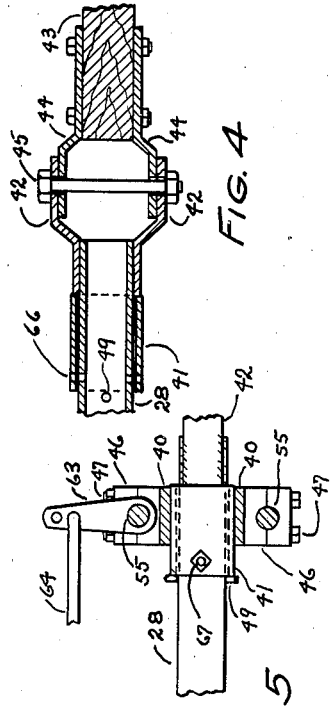
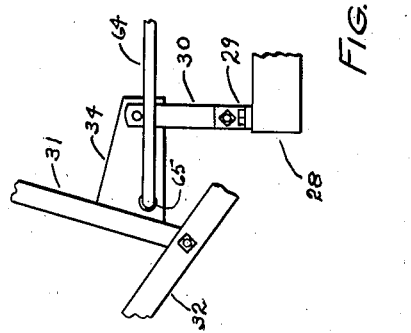
INVENTOR.
CLEMENT W. MICHAEL
BY
ATTORNEY Patented Oct. 26, 1943

2,332,806

UNITED STATES PATENT OFFICE 2,332,806

FARM IMPLEMENT FORETRUCK

Clement W. Michael, Racine, Wis., assignor to The Massey-Harris Company, Racine, Wis., a corporation of Maryland Application May 1, 1942, Serial No. 441,332

3 Claims. (Cl. 111—56)

The present invention relates to a foretruck, particularly adapted for use on corn planters and the like wherein the depth of the runners or furrow openers is determined by the carrying wheels of the planter frame in cooperation with the carrying wheels on the foretruck.

Conventional planters of the type have a lever controlled pole so the depth of the runners is determined by the carrying wheels and the height of the front end of the pole.

In conventional planters the furrow openers do not, for obvious reasons, plant the seed at a uniform depth. The present invention contemplates supporting the runners about midway between the carrying wheels of the planter frame and the foretruck wheels.

An object of the present invention is to provide a foretruck with transversely spaced wheels and position these wheels about the same distance in front of the runners as the distance between the runners and planter frame wheels and having means whereby the horizontal position of the furrow openers does not materially change when they are lifted out of the ground or set at various depths.

A further object of the present invention is to provide a foretruck having transversely spaced ground wheels which are castered to the foretruck and provide a pole or hitch which is horizontally pivoted to the foretruck or to the adjacent member of the planter so the planter as a unit is guided by the pole or hitch member.

A still further object of the present invention is to provide a foretruck which may either be longitudinally pivoted at its center to the forwardly projecting pole member of the planter or locked rigid to this pole member whereby each foretruck wheel may to a large degree, determine the depth of the adjacent furrow opener by imparting to the furrow opener frame a rocking motion independent of the frame carrying wheels.

Conventional foretrucks of the class have a single castered wheel. In turning, this single wheel shifts a considerable distance transversely from the center of the pole and therefore the near side of the runner frame sags considerably. A further object of the present invention is to provide means whereby this sagging does not occur.

To these and other useful ends, my invention consists of parts, combinations of parts, or their equivalents, and mode of operation, as hereinafter set forth and claimed and shown in the accompanying drawings in which:

Fig. 1 is a top view of a complete conventional planter equipped with my invention.

Fig. 2 is a side view of the device as shown in Figure 1.

Fig. 3 is a front view of a fraction of the foretruck.

Fig. 4 is an enlarged fractional section of the foretruck and guiding member.

Fig. 5 is an enlarged fractional side view illustrating the hand operated lever connections to the furrow opener frame and foretruck carrying wheels.

In the drawings, I designate the main frame in its entirety by reference character A. The transverse furrow carrying frame is designated in its entirety by reference character B and the foretruck in its entirety is designated by reference character C.

The main planter frame comprises side frame members 10 and 11. These members are generally formed integral with a rear cross member 12 as illustrated in Figure 1. A carrying axle 13 is preferably rotatably mounted on members 10 and 11 in the position shown and has adjustably mounted on its ends, ground wheels 14—14. Frame B comprises spaced bars 15 and 16, their ends being secured together by means of fork carrying brackets 17 and 18.

Members 15 and 16 are secured together adjacent the forward ends of members 10 and 11 by brackets 19—19, the forward ends of members 10 and 11 being pivoted to these brackets as at 20—20.

Member B includes furrow openers 25—25 which are suitably secured to posts 26—26, these posts being secured to members 15 and 16 for transverse adjustment as is the custom in devices of the class. Seed cans 27—27 are suitably mounted on posts 26 as illustrated. I provide a stub pole 28 and adjustably secure it to members 15 and 16 in a manner too well known to require further description.

Member 28 at its rear end is provided with a bracket 29 to which a link 30 is pivotally mounted. A hand operated lever 31 is pivotally mounted preferably to a seat supporting member 32 as illustrated and having a sector 33 and suitable appurtenances whereby the lever may be moved to and held in various positions, the lever having a forwardly projecting extension 34 to which link 64 is pivoted as illustrated; thus the rear end of member 28 may be raised and lowered relative to the front end of the planter frame.

Member C comprises frame bars 40—40 which are positioned on opposite sides of a sleeve 41 and welded thereto as illustrated, the sleeve being rotatably mounted on member 28 a short distance from the forward end as illustrated. On the protruding end of member 28 I secure brackets 42—42 being welded or otherwise secured to member 28. These brackets are shaped as illustrated in Figure 1.

I provide a hitch member 43 which is pivotally secured to members 42 by means of brackets 44—44 and a bolt 45. When the planter is drawn by horses, member 43 may be termed a pole which will then be adapted to carry the doubletree and the front end being adapted to carry a neck yoke. When a tractor hitch is desired, member 43 may be termed a hitch bar in which case it is considerably shorter than the pole adapted for a horse drawn device.

On opposite ends of members 40 I mount two piece bearing blocks 46—46 and secure these blocks to members 40 by means of bolts 47. Spacer sleeves 48 are positioned between the ends of members 40 and over bolts 47. Sleeve 41 is held longitudinally by the rear ends of members 42 and a bolt or cotter pin 49.

Axle members 55 are pivotally mounted in blocks 46 each having rearwardly extending arms 56 and outwardly extending portions 57 at their ends. Brackets 58 have sleeves 59 at their ends for the reception of members 57 as clearly illustrated in Figure 1 and being held on members 57 preferably by cotter pins 60—60. By scrutinizing Figure 2 it will be seen that members 58 can move vertically relative to members 40 on members 55 as axes.

Carrying wheels 61—61 are rotatably mounted on the free ends of caster axles 62 as illustrated in Figure 2. It will be seen that when sleeve 41 is free to turn on member 28, wheels 61 are free to travel over uneven ground independent of the forward end of member 28. A lever 63 is rigidly connected to upper member 55 and has a link connection 64 which is pivoted to member 34 of lever 31 as at 65. It will be seen that when lever 31 is moved rearwardly to raise the rear end of member 28, members 58 will be moved downwardly so the front end of member 28 will be raised about the same distance as the rear end. Clearly runners 25 will remain at substantially the same horizontal position at all positions brought about by the movement of lever 31. It will also be seen that wheels 14 and 61 will cooperate to determine the depth of runners 25.

Sleeve 41 and member 28 are preferably provided with apertures 66 (see Figure 4) whereby a bolt 67 may be used to lock these members together (see Figure 5). Generally planter frames are somewhat flexible so member B is permitted to rock transversely slightly; therefore when bolt 67 is in position to lock the sleeve, the depth of runners 25 will come more nearly under the control of wheels 61. In other words, the depth of runners 25 is largely determined by wheels 61 similar to the control wheels 14 would exercise over the runners in case the planter frame was rigid.

It will be seen that member 43 is exclusively a guiding means and operates because wheels 61 are castered to the foretruck frame, that lever 31 acts to definitely determine the depth of the runners and that the runners will be caused to plant the seed at a uniform depth.

Having thus shown and described my invention, I claim:

1. A device of the class described, comprising a main frame having spaced carrying wheels mounted on opposite sides thereof and intermediate its ends, a transverse furrow opener frame pivotally mounted to the forward end of said main frame, a stub pole secured to said transverse frame and extending a distance forward thereof and in rear of said pivotal mountings, a lever having means for raising and lowering the rear end of said stub pole relative to the main frame, a foretruck longitudinally pivotally mounted on the forward end of said stub pole and having transversely spaced ground wheels castered thereto, and means connecting said lever and ground wheels whereby the front and rear ends of said stub pole will be raised and lowered simultaneously.

2. A device of the class described, comprising a main frame having spaced carrying wheels mounted on opposite sides thereof and intermediate its ends, an elongated transverse frame having furrow openers and being pivotally mounted to the forward end of said main frame, a stub pole secured to said transverse frame and extending a distance forward thereof and a distance in rear of said pivotal mountings, a lever having means for raising and lowering the rear end of said stub pole relative to the main frame, a forestruck longitudinally pivotally mounted on the forward end of said stub pole and having transversely spaced ground wheels castered thereto, means connecting said lever and ground wheels, whereby the front and rear ends of said stub pole may be raised and lowered simultaneously, and means whereby said foretruck may be optionally locked in its pivot.

3. A device of the class described, comprising a main frame having spaced carrying wheels mounted on opposite sides thereof and intermediate its ends, an elongated transverse frame having furrow openers and being pivotally mounted to the forward end of said main frame, a stub pole secured to said transverse frame and extending a distance forward thereof and in rear of said pivotal mountings, a lever having means for raising and lowering the rear end of said stub pole relative to the main frame, a transversely arranged foretruck mounted on the forward end of said stub pole, vertically spaced shafts pivotally mounted on said foretruck, each shaft having rearwardly extending arms on their ends, outwardly extending extensions on the ends of said rearwardly extending arms forming cranks, vertically extending sleeves having brackets at opposite ends thereof through which said outwardly extending extensions rotatably extend, wheels having castered axles which rotatably extend upwardly through said sleeves whereby the wheels will move vertically simultaneously, another lever secured to one of said transverse shafts, and means connecting said levers whereby the front and rear ends of said stub pole may be raised and lowered simultaneously.

CLEMENT W. MICHAEL